US012634763B2

(12) United States Patent (10) Patent No.: US 12,634,763 B2
Uda (45) Date of Patent: May 19, 2026

(54) MEASUREMENT APPARATUS AND MEASUREMENT TARGET SETTING METHOD THEREOF

(71) Applicant: ANRITSU CORPORATION, Kanagawa (JP)

(72) Inventor: Yasuko Uda, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 363 days.

(21) Appl. No.: 18/482,317

(22) Filed: Oct. 6, 2023

(65) Prior Publication Data

US 2024/0155434 A1 May 9, 2024

(30) Foreign Application Priority Data

Nov. 9, 2022 (JP) ................................. 2022-179797

(51) Int. Cl.
| | |
|---|---|
| *H04W 28/20* | (2009.01) |
| *H04L 5/00* | (2006.01) |
| *H04W 48/20* | (2009.01) |
| *H04W 72/0453* | (2023.01) |
| *H04W 84/12* | (2009.01) |

(52) U.S. Cl.
CPC ........... *H04W 28/20* (2013.01); *H04L 5/0026* (2013.01); *H04W 48/20* (2013.01); *H04W 72/0453* (2013.01); *H04W 84/12* (2013.01)

(58) Field of Classification Search
CPC ..... H04L 5/0094; H04L 27/2603; H04L 5/00; H04L 27/26; H04L 5/0044; H04B 7/0452; H04B 7/0617; H04W 84/12; H04W 72/04; H04W 72/0453
See application file for complete search history.

(56) References Cited

U.S. PATENT DOCUMENTS

| | | | | |
|---|---|---|---|---|
| 8,274,951 B2* | 9/2012 | Liu | ........................ | H04L 1/0027 |
| | | | | 370/332 |
| 2014/0241193 A1* | 8/2014 | Sun | ........................ | H04L 1/0026 |
| | | | | 370/252 |
| 2021/0037402 A1* | 2/2021 | Uda | .................... | G06F 3/04817 |
| 2021/0075522 A1* | 3/2021 | Pettygrove | ........... | H04B 17/101 |
| 2021/0282146 A1* | 9/2021 | Kim | .................. | H04W 72/0453 |

FOREIGN PATENT DOCUMENTS

| | | |
|---|---|---|
| JP | 2021-022868 A | 2/2021 |

* cited by examiner

*Primary Examiner* — Mounir Moutaouakil
(74) *Attorney, Agent, or Firm* — McDonald Hopkins LLC

(57) ABSTRACT

A measurement apparatus includes a display unit that displays an image, and a control unit that displays a plurality of resource unit display portions, which are graphic forms indicating resource units disposed in a frequency bandwidth of a channel, on the display unit and allows selection of at least one of the plurality of resource unit display portions, in which the measurement apparatus performs measurement on radio signals transmitted and received by a communication apparatus to measure transmission/reception characteristics of the communication apparatus, and the control unit displays the resource unit display portions differently between a resource unit corresponding to a multiple resource unit of IEEE 802.11be and a resource unit that does not correspond to the IEEE 802.11be, and allows selection of a resource unit as a measurement target by allowing selection of at least one of the plurality of resource unit display portions.

10 Claims, 6 Drawing Sheets

| MRU type | MRU index | MRU combination |
|---|---|---|
| 52+26-tone MRU | MRU 1 | 52-tone RU 2+26-tone RU 2 |
| | MRU 2 | 52-tone RU 2+26-tone RU 5 |
| | MRU 3 | 52-tone RU 3+26-tone RU 8 |
| 106+26-tone MRU | MRU 1 | 106-tone RU 1+26-tone RU 5 |
| | MRU 2 | 106-tone RU 2+26-tone RU 5 |

MEASUREMENT APPARATUS AND MEASUREMENT TARGET SETTING METHOD THEREOF

TECHNICAL FIELD

The present invention relates to a measurement apparatus, and more particularly to a measurement apparatus that measures radio signals transmitted and received by a communication apparatus that operates in accordance with a communication standard of a wireless local area network (LAN).

BACKGROUND ART

Various wireless communication technologies are developed with development of information communication technologies. Among these, as a communication standard related to a wireless LAN technology, for example, institute of electrical and electronics engineers (IEEE) 802.11ac or IEEE 802.11ax is known.

In the IEEE 802.11ax, orthogonal frequency division multiple access (OFDMA) is adopted such that a larger number of users can use the same frequency bandwidth.

In the OFDMA of the IEEE 802.11ax, a frequency band of a channel is divided into sub-channels, each sub-channel is allocated to each user, and the frequency band of the channel can be used by a plurality of users.

In Patent Document 1, in a measurement apparatus that measures communication of the IEEE 802.11ax standard, a plurality of graphic forms indicating sub-channels in the channel bandwidth are displayed on a display unit, and a sub-channel as a measurement target is selected.

RELATED ART DOCUMENT

[Patent Document]
[Patent Document 1] JP-A-2021-022868

DISCLOSURE OF THE INVENTION

Problem that the Invention is to Solve

Recently, IEEE 802.11be, which is an extremely high throughput (EHT) wireless LAN standard, is proposed as the next version of the IEEE 802.11ax.

In the orthogonal frequency division multiple access (OFDMA) of the IEEE 802.11be, it is possible to divide a frequency band of a channel of a predetermined frequency bandwidth used for the communication into a plurality of resource units (RU), and to allocate the plurality of resource units to one terminal.

However, in a case in which the plurality of resource units are selected, a selectable resource unit is determined in the standard, and the selection cannot be freely performed.

In a case in which the measurement of the communication of the IEEE 802.11be is performed as described above, the measurement in which the resource unit is specified is required, but in the communication using the plurality of resource units, the selectable resource unit should be selected in accordance with the standard, and thus mistake of the user easily occurs, and there is a problem that the usability is deteriorated, such as taking time and effort to setting.

Therefore, the present invention is to provide a measurement apparatus that can easily designate a desired measurement target without any mistake in the measurement of the communication in the IEEE 802.11.

Means for Solving the Problem

An aspect of the present invention relates to a measurement apparatus including: a display unit that displays an image; and a control unit that displays a plurality of resource unit display portions, which are graphic forms indicating resource units disposed in a frequency bandwidth of a channel, on the display unit and allows selection of at least one of the plurality of resource unit display portions in a case in which measurement of communication in accordance with a standard of IEEE 802.11 is performed, in which the measurement apparatus performs measurement on radio signals transmitted and received by a communication apparatus to measure transmission/reception characteristics of the communication apparatus, and the control unit displays the resource unit display portions differently between a resource unit corresponding to a multiple resource unit (MRU) of the IEEE 802.11 and a resource unit that does not correspond to the IEEE 802.11, and allows selection of a resource unit as a measurement target by allowing selection of at least one of the plurality of resource unit display portions.

With this configuration, the resource unit display portions are displayed differently between the resource unit corresponding to the multiple resource unit of the IEEE 802.11 and the resource unit that does not correspond to the multiple resource unit of the IEEE 802.11 Therefore, it is possible to easily check a selectable resource unit and an unselectable resource unit, and it is possible to easily designate the desired measurement target without any mistake.

In addition, in the measurement apparatus according to the aspect of the present invention, the control unit may change, in a case in which the resource unit display portion of the resource unit corresponding to the multiple resource unit of the IEEE 802.11 is selected, display of the resource unit display portion of a resource unit capable of being paired with the resource unit as a multiple resource unit.

With this configuration, the display of the resource unit display portion of the resource unit capable of being paired with the resource unit selected as the multiple resource unit is changed. Therefore, it is possible to easily designate the desired measurement target without any mistake.

In addition, in the measurement apparatus according to the aspect of the present invention, the control unit may further display a resource unit (RU) type setting portion for setting a type of the multiple resource unit and an RU index setting portion for setting an index of the multiple resource unit, and may display the resource unit display portions in accordance with settings of the RU type setting portion and the RU index setting portion.

With this configuration, the display of the resource unit display portion is changed in accordance with the settings of the RU type setting portion and the RU index setting portion. Therefore, it is possible to easily check a position of the resource unit selected by the settings of the RU type setting portion and the RU index setting portion.

In addition, in the measurement apparatus according to the aspect of the present invention, the control unit may display the resource unit display portions differently between a resource unit corresponding to the type of the multiple resource unit set in the RU type setting portion and a resource unit that does not correspond to the type of the multiple resource unit set in the RU type setting portion.

With this configuration, the resource unit display portions are displayed differently between the resource unit corresponding to the type of the multiple resource unit set in the RU type setting portion and the resource unit that does not correspond to the type of the multiple resource unit set in the RU type setting portion. Therefore, it is possible to easily check a selectable resource unit and an unselectable resource unit, and it is possible to easily designate the desired measurement target without any mistake.

In addition, in the measurement apparatus according to the aspect of the present invention, the control unit may change the settings of the RU type setting portion and the RU index setting portion in accordance with selection of the resource unit display portion.

With this configuration, the settings of the RU type setting portion and the RU index setting portion are changed in accordance with the selection of the resource unit display portion. Therefore, it is possible to check the type of and the index of the multiple resource unit of the selected resource unit from a configuration image of the resource unit, and it is possible to easily designate the desired measurement target without any mistake.

In addition, another aspect of the present invention relates to a measurement target setting method of a measurement apparatus including a display unit that displays an image and performing measurement on radio signals transmitted and received by a communication apparatus to measure transmission/reception characteristics of the communication apparatus, the measurement target setting method including: a step of displaying a plurality of resource unit display portions, which are graphic forms indicating resource units disposed in a frequency bandwidth of a channel, on the display unit and allowing selection of at least one of the plurality of resource unit display portions in a case in which measurement of communication in accordance with a standard of IEEE 802.11 is performed; a step of displaying the resource unit display portions differently between a resource unit corresponding to a multiple resource unit (MRU) of the IEEE 802.11 and a resource unit that does not correspond to the IEEE 802.11; and a step of allowing selection of a resource unit as a measurement target by allowing selection of at least one of the plurality of resource unit display portions.

With this configuration, the resource unit display portions are displayed differently between the resource unit corresponding to the multiple resource unit of the IEEE 802.11 and the resource unit that does not correspond to the multiple resource unit of the IEEE 802.11 Therefore, it is possible to easily check the selectable resource unit and the unselectable resource unit, and it is possible to easily designate the desired measurement target without any mistake.

In addition, in the measurement target setting method according to the aspect of the present invention, in a case in which the resource unit display portion of the resource unit corresponding to the multiple resource unit of the IEEE 802.11 is selected, display of the resource unit display portion of a resource unit capable of being paired with the resource unit as a multiple resource unit may be changed.

In addition, in the measurement target setting method according to the aspect of the present invention, an RU type setting portion for setting a type of the multiple resource unit and an RU index setting portion for setting an index of the multiple resource unit may be further displayed, and the resource unit display portions may be displayed in accordance with settings of the RU type setting portion and the RU index setting portion.

In addition, in the measurement target setting method according to the aspect of the present invention, the display of the resource unit display portions may be displayed differently between a resource unit corresponding to the type of the multiple resource unit set in the RU type setting portion and a resource unit that does not correspond to the type of the multiple resource unit set in the RU type setting portion.

In addition, in the measurement target setting method according to the aspect of the present invention, the settings of the RU type setting portion and the RU index setting portion may be changed in accordance with selection of the resource unit display portion.

Advantage of the Invention

The present invention can provide the measurement apparatus that can easily designate the desired measurement target without any mistake in the measurement of the communication of the IEEE 802.11.

BEST MODE FOR CARRYING OUT THE INVENTION

A measurement apparatus according to an embodiment of the present invention will be described below in detail with reference to the drawings.

Figure 1:
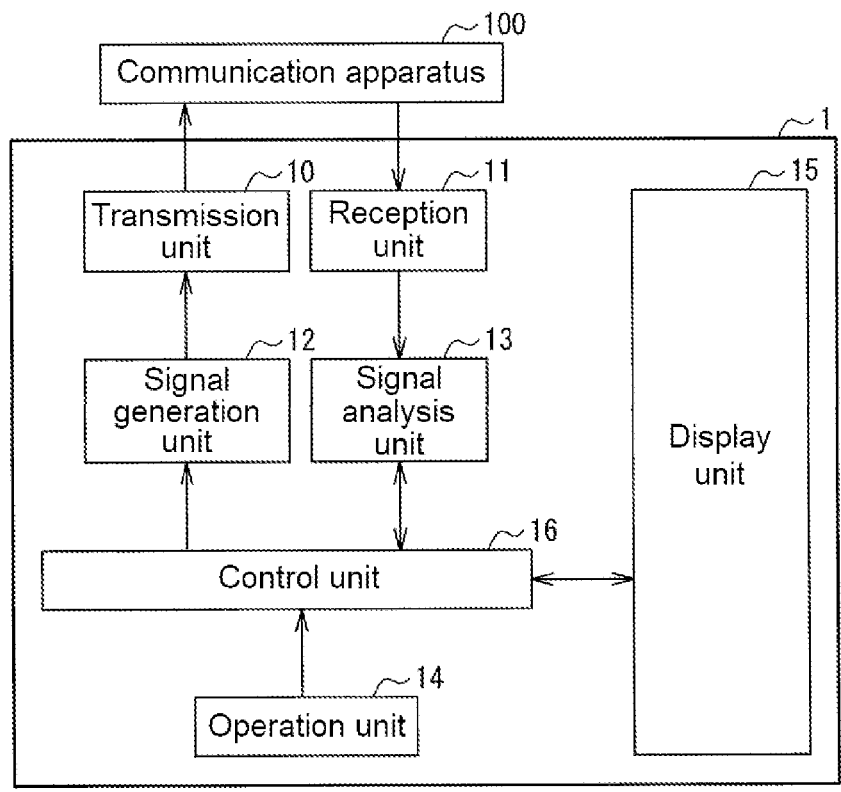
FIG. 1 is a block diagram of a measurement apparatus according to an embodiment of the present invention.

In FIG. 1, a measurement apparatus 1 according to the embodiment of the present invention performs wireless communication with a communication apparatus 100 and performs various types of measurement on radio signals transmitted and received by the communication apparatus 100. In the present embodiment, the measurement apparatus 1 operates as a wireless LAN access point (AP) and the communication apparatus 100 operates as a wireless LAN station (STA), but the measurement apparatus 1 and the communication apparatus 100 are not limited to these, and the measurement apparatus 1 may operate as the STA and the communication apparatus 100 may operate as the AP. It should be noted that the measurement apparatus 1 communicates with the communication apparatus 100 in accordance with a communication standard conforming to IEEE 802.11.

The measurement apparatus 1 includes a transmission unit 10, a reception unit 11, a signal generation unit 12, a signal analysis unit 13, an operation unit 14, a display unit 15, and a control unit 16.

The transmission unit 10 performs amplification or frequency conversion on signals generated by the signal generation unit 12, and transmits the signals to the communication apparatus 100.

The reception unit 11 performs amplification or frequency conversion on radio signals received from the communication apparatus 100, and outputs the radio signals to the signal analysis unit 13.

The signal generation unit 12 generates signals including a control packet or a data packet for communicating with the communication apparatus 100, and transmits the signals to the communication apparatus 100 via the transmission unit 10.

The signal analysis unit 13 analyzes the radio signals received from the communication apparatus 100 via the reception unit 11, and performs a process of measuring transmission/reception characteristics of the communication apparatus 100. The transmission/reception characteristics include a packet error rate, error vector magnitude (EVM), transmission power, and the like.

The operation unit 14 includes input devices, such as a keyboard, a mouse, and a touch panel, and outputs information input by an operation to the control unit 16.

The display unit 15 includes an image display device, such as a liquid crystal display, and displays an image for inputting information required for the measurement, an image indicating a measurement result, or the like.

The control unit 16 is configured of a computer unit including a central processing unit (CPU), a random access memory (RAM), a read only memory (ROM), a hard disk device, and an input/output port (all of which are not illustrated).

The ROM and the hard disk device of this computer unit store a program for causing the computer unit to function as the control unit 16 together with various control constants, various maps, or the like. That is, by the CPU executing the program stored in the ROM and the hard disk device, the computer unit functions as the control unit 16. It should be noted that the hard disk device may be a compact flash (CF) card using a flash memory.

The signal generation unit 12, the signal analysis unit 13, the operation unit 14, and the display unit 15 are connected to the input/output port of the control unit 16, and the control unit 16 and each unit can transmit and receive the signals to and from each other.

The measurement apparatus 1 according to the present embodiment can perform measurement of the communication in accordance with a standard of IEEE 802.11be.

In the IEEE 802.11be, the communication is performed by dividing a channel of a predetermined frequency bandwidth used for the communication into resource units consisting of a predetermined number of sub-carriers, and allocating a terminal for each resource unit or allocating a plurality of resource units to one terminal.

The minimum number of sub-carriers configuring the resource unit is 26 (26-tone RU), and there are further 52 (52-tone RU), 106 (106-tone RU), 242 (242-tone RU), 484 (484-tone RU), 996 (996-tone RU), and the like. The frequency bandwidth of the channel includes 20 MHz, 40 MHz, 80 MHz, 160 MHz, and the like.

Figures 2, 3:
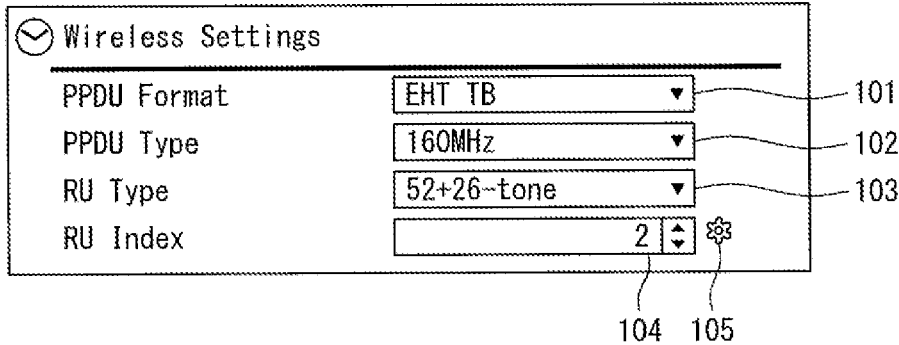
FIG. 2 is a diagram illustrating an example of a wireless communication setting image of the measurement apparatus according to the embodiment of the present invention.
FIG. 3 is a diagram illustrating a combination of RUs in accordance with a type of an MRU and an index of the MRU in a case in which a frequency bandwidth of a channel is 20 MHz in IEEE 802.11be.

The control unit 16 displays an image (wireless setting image) as illustrated in FIG. 2 on the display unit 15 to perform settings of wireless communication.

In FIG. 2, a PPDU format selection portion 101 allows the selection of a format of a physical layer convergence protocol (PLCP) protocol data unit (PPDU).

A PPDU type selection portion 102 allows the selection of the frequency bandwidth of the channel. The frequency bandwidth of the channel is selectable from among, for example, 20 MHz, 40 MHz, 80 MHz, and 160 MHz.

In a case in which "EHT TB" is selected in the PPDU format selection portion 101, the control unit 16 displays an RU type setting portion 103, an RU index setting portion 104, and an RU allocation selection icon 105.

The RU type setting portion 103 allows the setting of a type of the RU defined by the standard. For example, in a case in which a type with one numeral, such as 26, 52, 106, 242, 484, 996, 2×996, or the like, is selected as the type of the RU, a single RU (SRU) that uses only one RU is used.

In a case in which a type with a numeral+numeral, such as 52+26, 106+26, 484+242, 996+484, or the like is selected as the type of the RU, a multiple RU (MRU) that uses a plurality of RUs is used.

The RU index setting portion 104 allows the setting of the index of the RU, which is defined by the standard, of the single RU or the multiple RU.

In the IEEE 802.11be, for example, in a case of the MRU, a combination of the RUs to be used is defined by the type of the MRU and the index of the MRU, as illustrated in FIG. 3. It should be noted that FIG. 3 illustrates the combination of the RUs in a case in which the frequency bandwidth of the channel is 20 MHz.

In this way, the resource unit is selectable in accordance with the type of the MRU and the index of the MRU defined by the standard, and the resource unit of the MRU can be easily selected.

It should be noted that the control unit 16 prohibits the settings other than the type of the RU and the index of the RU which are allocated by the standard, in the RU type setting portion 103 and the RU index setting portion 104.

For example, the RU type setting portion 103 displays the types of the RU defined by the standard in a drop-down list for the selection. In the RU index setting portion 104, only the index of the RU selectable by the type of the RU selected in the RU type setting portion 103 can be set, and in a case in which the index of an unselectable RU is set, the setting is canceled, and the original value is restored.

In addition, in a case in which the value set in the RU index setting portion 104 is an unselectable value when the type of the RU is set in the RU type setting portion 103, the control unit 16 sets the minimum value among the indices of the selectable RU in the RU index setting portion 104.

In a case in which, for example, the RU allocation selection icon 105 is selected by being clicked by the mouse of the operation unit 14, the control unit 16 displays an image of a configuration image of the RU (RU configuration image) corresponding to the frequency bandwidth selected in the PPDU type selection portion 102 on the display unit 15, and allocates the RU as the measurement target.

Figure 4:
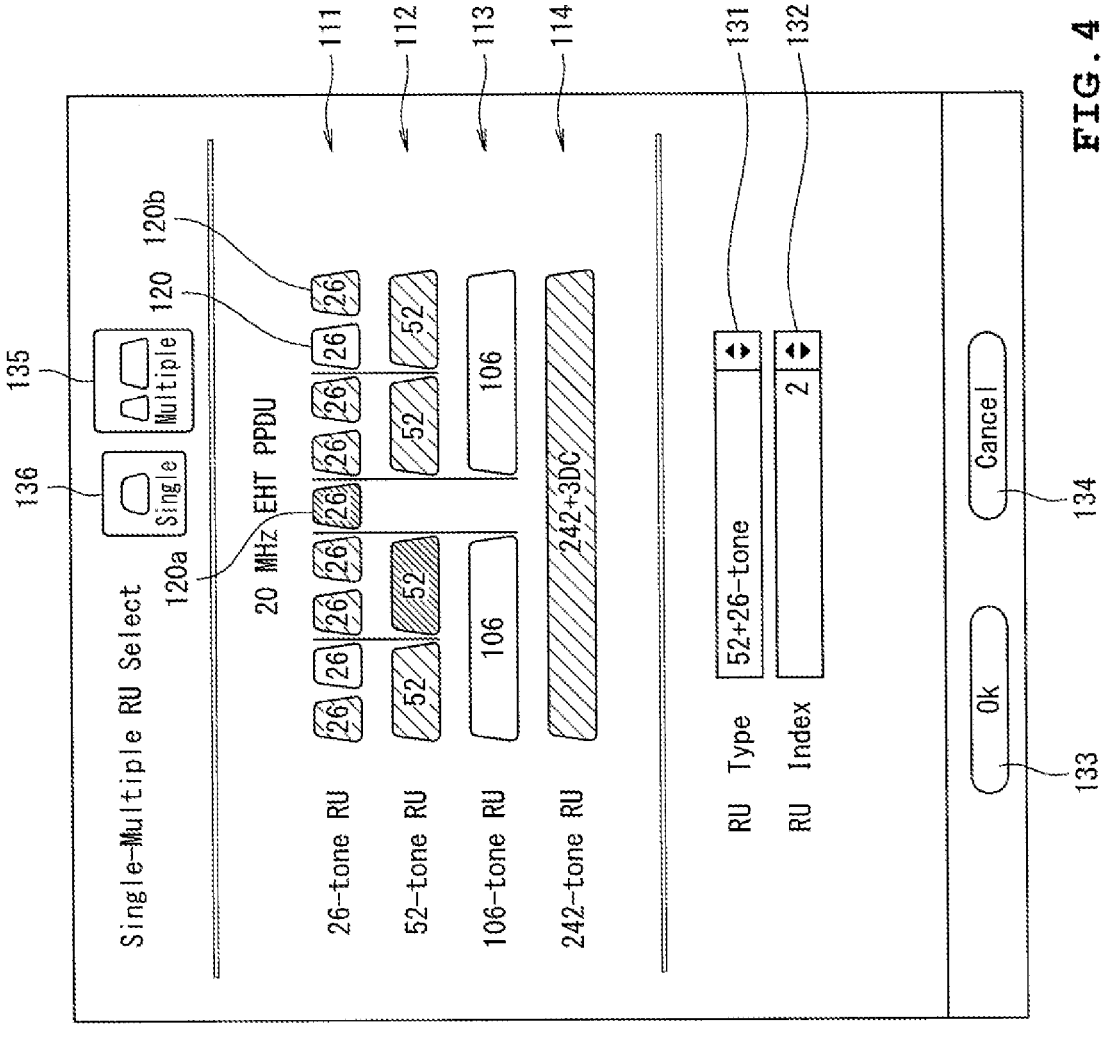
FIG. 4 is a diagram illustrating a resource unit configuration image in a case in which the frequency bandwidth of the channel of the measurement apparatus according to the embodiment of the present invention is 20 MHz.

In a case in which the frequency bandwidth selected in the PPDU type selection portion 102 is 20 MHz and the type of the RU selected in the RU type setting portion 103 is the MRU, the control unit 16 displays the image as illustrated in FIG. 4 on the display unit 15, and allocates the RU as the measurement target. A horizontal direction in FIG. 4 represents the frequency band, and the frequency is higher toward the right.

In FIG. 4, in a 26-tone display selection portion 111, which is a group in a row direction, the resource units for the 26-tone RU are displayed for the selection. In a 52-tone display selection portion 112, the resource units for the 52-tone RU are displayed for the selection. In a 106-tone display selection portion 113, the resource units for the 106-tone RU are displayed for the selection. In a 242-tone display selection portion 114, the resource units for the 242-tone RU are displayed for the selection.

In each display selection portion, resource unit display portions 120 representing the respective resource units are displayed by the number of the resource units. The resource unit display portion 120 represents, for example, the frequency bandwidth of each resource unit and a position on the frequency bandwidth of the channel with an approximately trapezoidal graphic form.

In this way, it is possible to easily check a position of the resource unit being selected or the resource unit to be selected, and it is possible to easily designate the desired measurement target without any mistake.

The control unit 16 changes and displays the display of the resource unit display portion 120 between unselected, being selected (=selected), and unselectable. Unselectable indicates the resource unit that is not available in the selected PPDU type. Unselected indicates the resource unit that is available in the selected PPDU type but is not selected.

For example, the control unit 16 displays, for example, the display of the resource unit display portion 120 being selected, as in a resource unit display portion 120a. For example, the control unit 16 displays, for example, the display of the unselectable resource unit display portion 120 as in a resource unit display portion 120b. The resource unit display portion 120a and the resource unit display portion 120b are different from each other such that the display modes can be distinguished.

In this way, since the display of the resource unit display portion 120 is changed between unselected, being selected, and unselectable, it is possible to easily check the unselectable resource unit, and it is possible to easily designate the desired measurement target without any mistake.

For example, based on the type of the RU and the index of the RU, which are set in the RU type setting portion 103 and the RU index setting portion 104 in FIG. 2, the control unit 16 sets the display of the resource unit display portion 120 of the resource unit determined from the type of the RU and the index of the RU, which are set, as being selected, sets the display of the resource unit display portion 120 of the unselectable resource unit determined from the type of the RU and the index of the RU, which are set, as unselectable, and sets the display of the resource unit display portion 120 of the selectable resource unit determined from other set types of the RU as unselected.

In this way, it is possible to easily check the position of the resource unit being selected, and it is possible to easily designate the desired measurement target without any mistake.

The RU type setting portion 131 can display the type of the RU set in the RU type setting portion 103 in FIG. 2 as an initial value, and can set the type of the RU by the operation of the user.

The RU index setting portion 132 can display the index of the RU set by the RU index setting portion 104 in FIG. 2 as an initial value, and can set the index of the RU by the operation of the user.

In this way, it is possible to select the resource unit in accordance with the type of the RU and the index of the RU defined by the standard, and it is possible to easily select the resource unit of the MRU.

The control unit 16 switches the display of the resource unit display portions 120 in accordance with, for example, the settings of the RU type setting portion 131 and the RU index setting portion 132.

For example, the control unit 16 sets the display of the resource unit display portion 120 of the RU determined from the type of the RU and the index of the RU, which are set in the RU type setting portion 131 and the RU index setting portion 132, as being selected, sets the display of the resource unit display portion 120 of the unselectable RU determined from the type of the RU and the index of the RU, which are set, as unselectable, and sets the display of the resource unit display portion 120 of the selectable RU determined from other set types of the RU as unselected.

In this way, it is possible to select the resource unit in accordance with the type of the RU and the index of the RU defined by the standard, and it is possible to easily check the position of the selected resource unit.

Further, in a case in which the resource unit display portion 120 displayed as unselected is selected by, for example, performing a click operation by the operation of the mouse of the operation unit 14, the control unit 16 switches the display of the resource unit display portion 120 of the RU corresponding to the selected RU as being selected, and switches the display of the RU type setting portion 131 and the RU index setting portion 132 in accordance with the selected RU.

For example, in a case in which there are a plurality of combinations of the selected RUs, the control unit 16 adopts the combination in which the value of the index of the MRU is the minimum, and switches the display.

In this way, it is possible to select the resource unit of the measurement target from the configuration image of the resource unit, and it is possible to easily designate the desired measurement target without any mistake.

In addition, since the resource unit paired with the selected resource unit is automatically being selected, it is possible to easily designate the desired measurement target without any mistake.

In addition, it is possible to check the type of and the index of the MRU of the selected resource unit from the configuration image of the resource unit, and it is possible to easily designate the desired measurement target without any mistake.

Further, in a case in which any of the resource unit display portions 120 of the unselected RUs is selected by performing the click operation by the operation of the mouse of the operation unit 14, the control unit 16 displays the resource unit display portion 120 of the RU of a candidate to be paired with the selected RU as a candidate different from unselected, being selected, and unselectable. It should be noted that, in a case in which the combination of the RUs is uniquely determined by the first selected RU, the resource unit display portion 120 of the corresponding second RU is also displayed as being selected.

In this way, since the display of the resource unit as the candidate to be paired with the selected resource unit is changed, it is possible to easily designate the desired measurement target without any mistake.

In addition, in a case in which the resource unit paired with the selected resource unit is uniquely determined, since the resource unit is automatically being selected, it is possible to easily designate the desired measurement target without any mistake.

It should be noted that the control unit 16 may switch the display of the resource unit display portions 120 in accordance with the settings of the RU type setting portion 131 and the RU index setting portion 132.

In this way, it is possible to easily check the position of the resource unit selected by the settings of the RU type setting portion 131 and the RU index setting portion 132.

Also, the settings may be performed in the RU type setting portion 103, the RU index setting portion 104, the RU type setting portion 131, and the RU index setting portion 132, and the resource unit display portion 120 may be used to only check the display.

In FIG. 4, a confirm button 133 allows the confirmation of the setting of the resource unit being selected. In a case in which the confirm button 133 is selected by the operation of the operation unit 14, the control unit 16 sets the resource unit, being selected, corresponding to the resource unit display portion 120a, as the resource unit as the measurement target, and returns the display of the display unit 15 to the display of FIG. 2 (display in FIG. 4 disappears). In this case, the control unit 16 displays the type of the selected resource unit in the RU type setting portion 103 and the index in the RU index setting portion 104.

In FIG. 4, a cancel button 134 allows the cancellation of the changed setting of the resource unit being selected. In a case in which the cancel button 134 is selected by the operation of the operation unit 14, the control unit 16 sets the resource unit selected before displaying the image in FIG. 4 as the resource unit as the measurement target, and returns the display of the display unit 15 to the display of FIG. 2. In this case, the control unit 16 displays the type of the resource unit before displaying the image of FIG. 4 in the RU type setting portion 103 and the index in the RU index setting portion 104.

An MRU switching button 135 switches the type of the RU to the MRU. An SRU switching button 136 switches the type of the RU to SRU. In a case in which the MRU switching button 135 is selected by the click operation by the operation of the mouse of the operation unit 14, the control unit 16 switches the type of the RU to the MRU. In a case in which the SRU switching button 136 is selected by the click operation by the operation of the mouse of the operation unit 14, the control unit 16 switches the type of the RU to the SRU.

In a case in which the type of the RU is the MRU, the control unit 16 displays the MRU switching button 135 to be larger than the SRU switching button 136 as illustrated in FIG. 4. In a case in which the type of the RU is the SRU, the control unit 16 displays the SRU switching button 136 to be larger than the MRU switching button 135, contrary to the illustration of FIG. 4.

In this way, it is possible to easily know whether the type of the RU that is being currently selected is the SRU or the MRU, and it is possible to easily designate the desired measurement target without any mistake.

Figure 5:
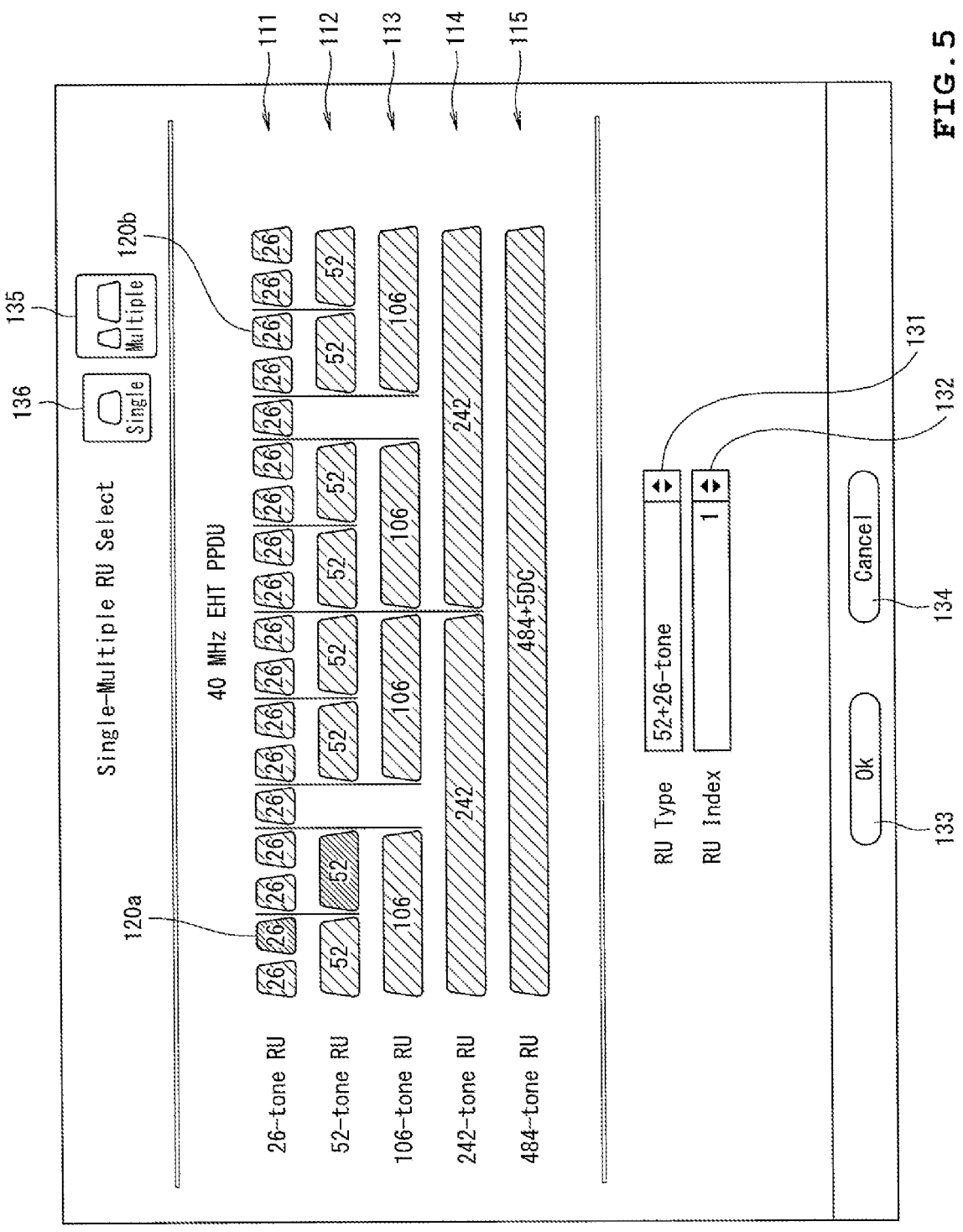
FIG. 5 is a diagram illustrating a resource unit configuration image in a case in which the frequency bandwidth of the channel of the measurement apparatus according to the embodiment of the present invention is 40 MHz.

In a case in which the frequency bandwidth selected in the PPDU type selection portion 102 is 40 MHz, the control unit 16 displays the image as illustrated in FIG. 5 on the display unit 15, and allocates the RU as the measurement target.

In FIG. 5, in addition to a case in which the frequency bandwidth is 20 MHz, a 484-tone display selection portion 115 is displayed. In the 484-tone display selection portion 115, the resource units for 484-tone RU are displayed for the selection.

Figure 6:
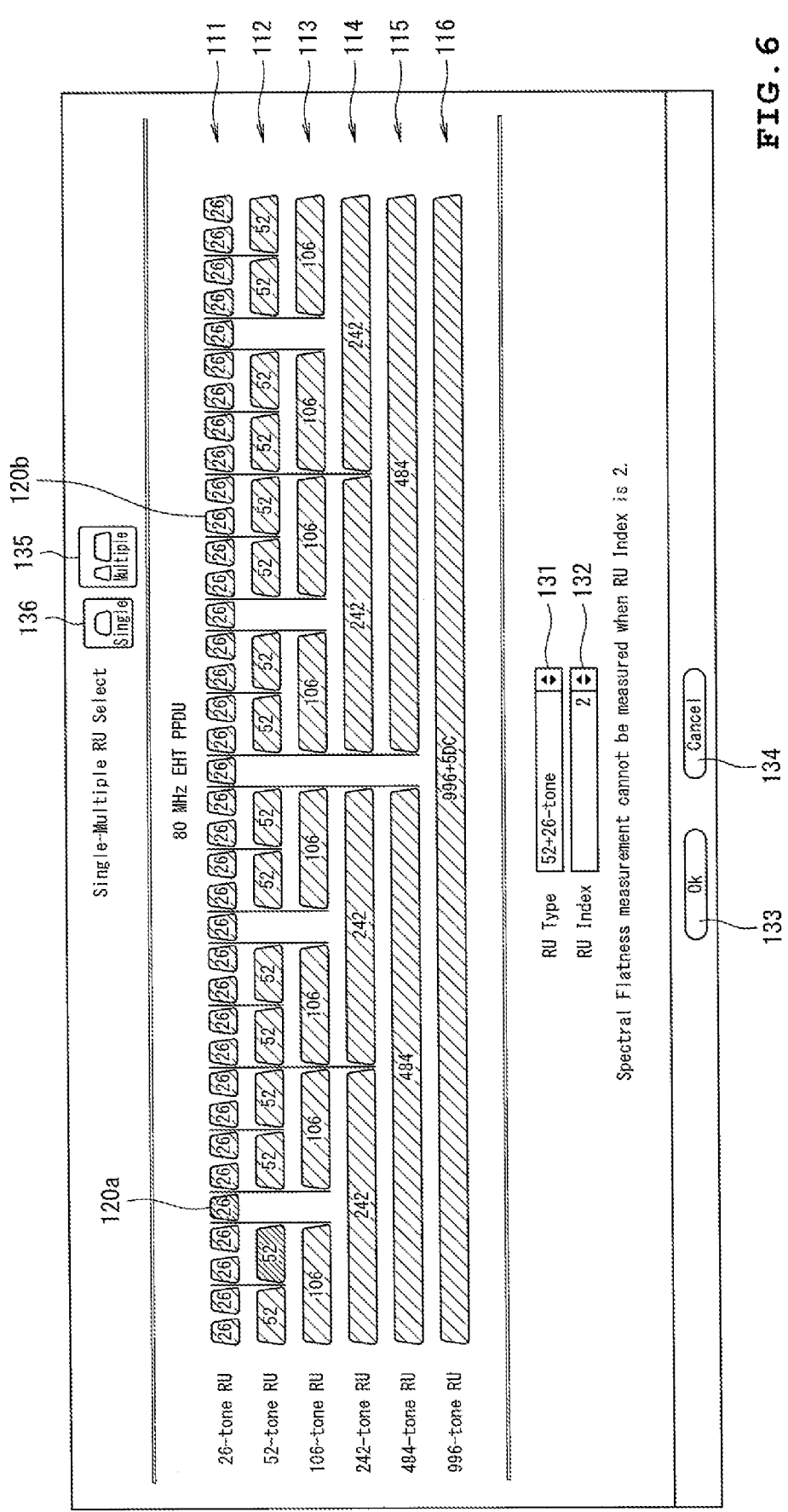
FIG. 6 is a diagram illustrating a resource unit configuration image in a case in which the frequency bandwidth of the channel of the measurement apparatus according to the embodiment of the present invention is 80 MHz.

In a case in which the frequency bandwidth selected in the PPDU type selection portion 102 is 80 MHz, the control unit 16 displays the image as illustrated in FIG. 6 on the display unit 15, and allocates the RU as the measurement target.

In FIG. 6, in addition to a case in which the frequency bandwidth is 40 MHz, a 996-tone display selection portion 116 is displayed. In the 996-tone display selection portion 116, the resource units for 996-tone RU are displayed for the selection.

Figure 7:
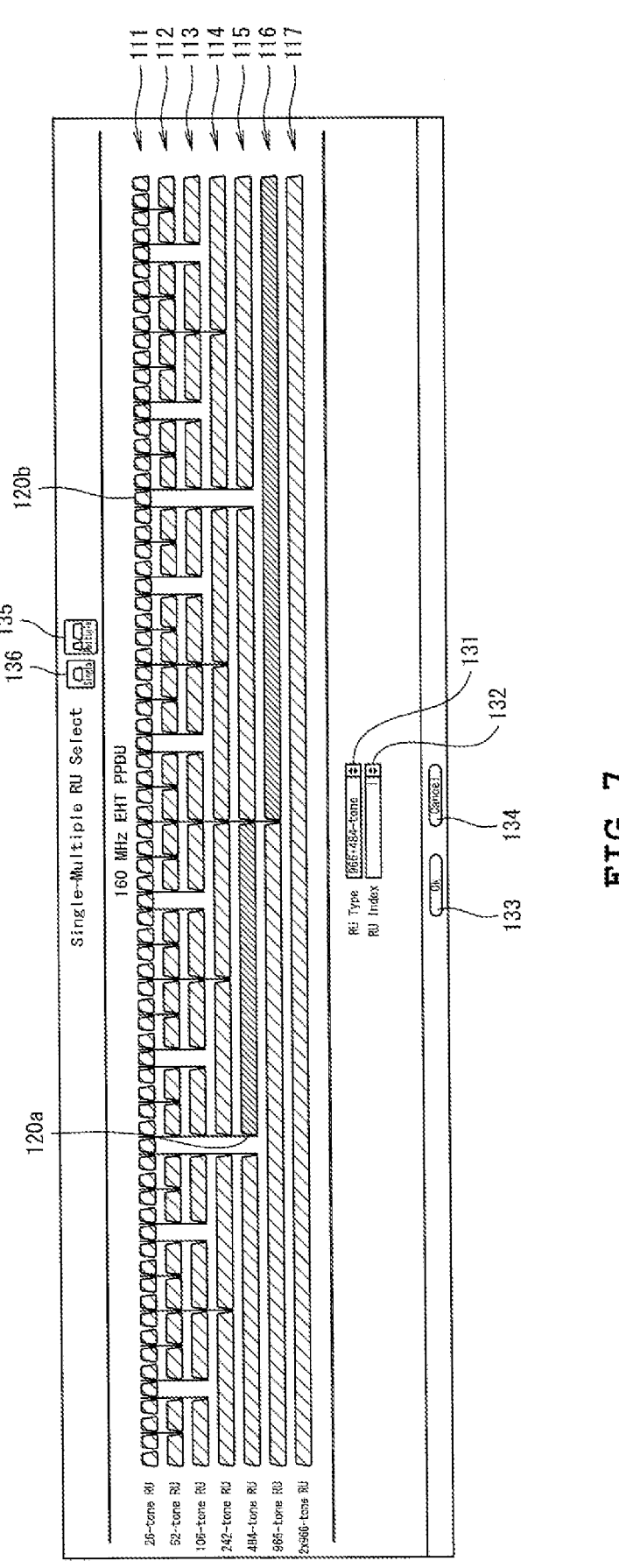
FIG. 7 is a diagram illustrating a resource unit configuration image in a case in which the frequency bandwidth of the channel of the measurement apparatus according to the embodiment of the present invention is 160 MHz.

In a case in which the frequency bandwidth selected in the PPDU type selection portion 102 is 160 MHz, the control unit 16 displays the image as illustrated in FIG. 7 on the display unit 15, and allocates the RU as the measurement target.

In FIG. 7, in addition to a case in which the frequency bandwidth is 80 MHz, a 2×996-tone display selection portion 117 is displayed. In the 2×996-tone display selection portion 117, the resource units for 2×996-tone RU are displayed for the selection.

The control unit 16 uses the resource units set in this way to perform communication with the communication apparatus 100 to perform various types of measurement. For example, an operator selects and confirms the resource unit to be transmitted by the communication apparatus 100, by using the RU configuration image of FIG. 4. The transmission unit 10 notifies the communication apparatus 100 of measurement conditions including the selected resource unit, and the communication apparatus 100 transmits back predetermined signals to the measurement apparatus 1 by the designated resource unit. The measurement apparatus 1 receives the signals transmitted back by the reception unit 11, and measures the transmission characteristics and the like by the signal analysis unit 13.

It should be noted that, in the present embodiment, although the measurement apparatus integrated with the operation unit 14 or the display unit 15 has been described as an example, for example, a configuration may be adopted in which the signal generation unit 12 or the signal analysis unit 13 is controlled from a program of a personal computer connected via a network or the like.

Also, in the present embodiment, the IEEE 802.11be has been described as an example, but the present invention can be applied to other communication standards that require the selection of the selectable resource units in accordance with the standard.

Although the embodiment of the present invention has been disclosed, it is apparent that modifications may be made by those skilled in the art without departing from the scope of the present invention. All such modifications and equivalents are intended to be included in the following claims.

DESCRIPTION OF REFERENCE NUMERALS AND SIGNS

1 Measurement apparatus
14 Operation unit
15 Display unit
16 Control unit
100 Communication apparatus
102 PPDU type selection portion
103, 131 RU type setting portion
104, 132 RU index setting portion
105 RU allocation selection icon
120, 120a, 120b Resource unit display portion

What is claimed is:

1. A measurement apparatus comprising:

a display unit that displays an image; and a control unit that displays a plurality of resource unit display portions, which are graphic forms indicating resource units disposed in a frequency bandwidth of a channel, on the display unit and allows selection of at least one of the plurality of resource unit display portions in a case in which measurement of communication in accordance with a standard of IEEE 802.11 is performed, wherein the measurement apparatus performs measurement on radio signals transmitted and received by a communication apparatus to measure transmission/reception characteristics of the communication apparatus, and the control unit displays the resource unit display portions differently between a selectable resource unit corresponding to a multiple resource unit (MRU) of the IEEE 802.11 standard and an unselectable resource unit that does not correspond to the IEEE 802.11 standard, and allows selection of the selectable resource unit as a measurement target by allowing selection of at least one of the plurality of resource unit display portions, the display portion of the selectable resource unit being different based on whether or not the resource unit is presently selected.

2. The measurement apparatus according to claim 1, wherein the control unit changes, in a case in which the resource unit display portion of the resource unit corresponding to the multiple resource unit of the IEEE 802.11 is selected, display of the resource unit display portion of a resource unit capable of being paired with the resource unit as a multiple resource unit.

3. The measurement apparatus according to claim 1, wherein the control unit further displays a resource unit (RU) type setting portion for setting a type of the multiple resource unit and an RU index setting portion for setting an index of the multiple resource unit, and displays the resource unit display portions in accordance with settings of the RU type setting portion and the RU index setting portion.

4. The measurement apparatus according to claim 3, wherein the control unit displays the resource unit display portions differently between a resource unit corresponding to the type of the multiple resource unit set in the RU type setting portion and a resource unit that does not correspond to the type of the multiple resource unit set in the RU type setting portion.

5. The measurement apparatus according to claim 4, wherein the control unit changes the settings of the RU type setting portion and the RU index setting portion in accordance with selection of the resource unit display portion.

6. A measurement target setting method of a measurement apparatus including a display unit that displays an image and performing measurement on radio signals transmitted and received by a communication apparatus to measure transmission/reception characteristics of the communication apparatus, the measurement target setting method comprising:

a step of displaying a plurality of resource unit display portions, which are graphic forms indicating resource units disposed in a frequency bandwidth of a channel, on the display unit and allowing selection of at least one of the plurality of resource unit display portions in a case in which measurement of communication in accordance with a standard of IEEE 802.11 is performed;

a step of displaying the resource unit display portions differently between a selectable resource unit corresponding to a multiple resource unit (MRU) of the IEEE 802.11 standard and an unselectable resource unit that does not correspond to the IEEE 802.11 standard; and a step of allowing selection of the selectable resource unit as a measurement target by allowing selection of at least one of the plurality of resource unit display portions, the display portion of the selectable resource unit being different based on whether or not the resource unit is presently selected.

7. The measurement target setting method according to claim 6, wherein, in a case in which the resource unit display portion of the resource unit corresponding to the multiple resource unit of the IEEE 802.11 is selected, display of the resource unit display portion of a resource unit capable of being paired with the resource unit as a multiple resource unit is changed.

8. The measurement target setting method according to claim 6, wherein an RU type setting portion for setting a type of the multiple resource unit and an RU index setting portion for setting an index of the multiple resource unit are further displayed, and the resource unit display portions are displayed in accordance with settings of the RU type setting portion and the RU index setting portion.

9. The measurement target setting method according to claim 8, wherein the resource unit display portions are displayed differently between a resource unit corresponding to the type of the multiple resource unit set in the RU type setting portion and a resource unit that does not correspond to the type of the multiple resource unit set in the RU type setting portion.

10. The measurement target setting method according to claim 9, wherein the settings of the RU type setting portion and the RU index setting portion are changed in accordance with selection of the resource unit display portion.

* * * * *